United States Patent [19]

Parker et al.

[11] Patent Number: 4,553,698

[45] Date of Patent: Nov. 19, 1985

[54] PNEUMATIC PESTICIDE DUSTER FOR TREATMENT OF STRUCTURES

[75] Inventors: Richard L. Parker; Richard J. Swords; Larry E. Griffin, all of Ponca City, Okla.

[73] Assignee: Parker Pest Control, Ponca City, Okla.

[21] Appl. No.: 464,369

[22] Filed: Feb. 7, 1983

[51] Int. Cl.[4] .......... B05B 5/08; B05B 7/14

[52] U.S. Cl. .......... 239/3; 239/690; 239/654; 239/143; 366/101; 406/136

[58] Field of Search .......... 239/3, 690, 692, 143, 239/654, 325, 154; 366/101; 222/195; 406/138, 136, 137

[56] References Cited

U.S. PATENT DOCUMENTS

| | | | |
|---|---|---|---|
| 1,852,522 | 4/1932 | Hoelscher | 239/654 |
| 2,391,048 | 12/1945 | Vose | 239/654 |
| 2,477,947 | 8/1949 | Yadoff | 239/3 X |
| 2,657,339 | 10/1953 | Hampe | 239/654 X |
| 3,993,245 | 11/1976 | Smith | 239/154 X |

FOREIGN PATENT DOCUMENTS

| | | | |
|---|---|---|---|
| 55166 | 10/1951 | France | 239/654 |
| 2018803 | 6/1970 | France | 239/143 |
| 393289 | 11/1973 | U.S.S.R. | 406/138 |

*Primary Examiner*—Andres Kashnikow

*Attorney, Agent, or Firm*—Robert M. Hessin

[57] ABSTRACT

A pneumatic pesticide duster for use in the application of pesticide dusts in structures. The apparatus comprises a dust reservoir, compressed air source, manually operated control valve and metallic discharge tube having an opening ranging in size up to about $\frac{3}{4}$ inch capable of imparting an electrostatic charge to the expelled air/-dust mixture such that dust is attracted to the walls of the structure and to insects therein. The apparatus is easily handled by one person while the amount of pesticide dispensed within the structure and the areas to which the pesticide is confined can be closely controlled.

10 Claims, 7 Drawing Figures

PR
D
1
2
3
4
5
6
7
8
9
10
11
12
13
15
16
17
18
20
21
22
30
31

PNEUMATIC PESTICIDE DUSTER FOR TREATMENT OF STRUCTURES

BACKGROUND OF THE INVENTION

The present invention relates to an apparatus and for dispensing pesticide dusts within structures. More particularly, the instant invention deals with an apparatus and method intended for use in the application of pesticides by dusting within structures, especially structures inhabited by humans.

Prior Art

In many cases it is desirable to apply a substantially uniform coat of powder to objects. Many manufacturing operations use powdered resin to coat articles or to coat a particular section of an article before curing. Other uses for powdered dry materials are known, such as plant related insecticides. Methods of applying pesticides, fungicides, fertilizers and similar such materials to plants in the agricultural and ornamental environments are well known. Many prior art devices have been developed and are known for mixing solid particulate matter with a fluid flowstream of either air or liquid for ultimately dispensing the solid material onto a predetermined object or surface. U.S. Pat. No. 2,447,947 teaches that plants can be treated by "fogging" with a convergent/divergent nozzle and a liquid/powder mix by forcing air through a reservoir containing said mix while simultaneously imparting an electrostatic charge to the expelled material. This reference utilizes water or steam globular particles to entrain powder and "fog" said powder onto vegetation. This device has severe disadvantages within structures since no control can be obtained for particular pest harborages without contacting inhabitants of the structure.

U.S. Pat. No. 4,140,280 shows a portable hand-held manually operated duster. However, this device simply throws dust from a reservoir or hopper and has no method of control of the dust. In addition, the dust expelled by such a device tends to substantially all fall to the lower regions of areas treated. The device is intended primarily for outdoor agricultural use and is not suitable for human habitations. Other air-charged pressure dusters on the market are self contained. They discharge relatively large volumes of dust at high pressures in a very short period of time (and do not utilize a separate, continuous, regulated air source), thus are not suitable for crack & crevice treatment in structures inhabited by humans.

U.S. Pat. No. 3,339,840 utilizes an electrostatic field produced by a high voltage electric generator in order to attract dust to vegetation in the form of finely divided electrically charged particles. This device, however, is intended for agricultural use and does not provide control for dusting within structures.

U.S. Pat. No. 2,302,289 shows an apparatus for the atomization of spray liquids in the presence of an intense electrical field which is generated by an outside power source. This apparatus is designed for the application of spray oils to plants by atomization of the spray oil only without the use of a diluent. U.S. Pat. No. 3,212,211 relates to agricultural instruments used for the placing of insecticide dust on plants by imparting an electrostatic charge to the expelled dust through the use of an electrical power source. This apparatus is operated by a hand crank and does not provide control of the dust within carefully confined areas. U.S. Pat. No. 4,256,241 shows a pesticide duster utilizing a fluid/solid mix apparatus where the fluid is air. This apparatus is designed for the application of pesticides, fertilizers, and fungicides to plants in agricultural and oramental environments and is likewise not suitable for the fine control necessary for structural applications.

While other examples of powdered dispensers are known in the art, it should be noted that prior art teachings concerning fluid/fluid mixing and dispensing as well as fluid/gas mixing and dispensing apparatus are related to the subject matter of the present invention. For example, U.S. Pat. No. 4,039,105 discloses a liquid-liquid mixing and dispensing device for application of liquid fertilizer in combination with water delivered by an ordinary garden hose.

However, when considering the prior art teachings and with particular regard to those devices which dispense powder and dust, unresolved problems are readily apparent when such devices are applied to the treatment of pest harborages within structures, particularly inhabited structures. Virtually all the prior art devices are designed for use in open environments such as agricultural or ornamental uses and do not provide fine control of the dust. Use of such devices within structures would be inconvenient, a nuisance, and pose potential problems to the inhabitants of the structure, depending upon the pesticide utilized. For example, depending upon the powder material being utilized, extensive cleaning of the structure will be required. Further, toxicity, respiratory and contamination problems will be encountered. In addition, the prior art devices do not provide specific treatment of pest harborages within structures, rendering such treatments substantially ineffective in eradicating all pests from harborages and providing a pesticide barrier for future incursions into the pest harborages.

It is therefore apparent that there is a great need for a pesticide duster which will provide fine control within structures, particularly inhabited structures, completely treat pest harborages, coating surfaces and any pest therein, and providing long-term control of said pests. Since the apparatus is designed for use with structures, the apparatus should be easily handled by one person, provide access to pest harborages, and provide fine control for the amount of pesticide dust being dispensed.

SUMMARY OF THE INVENTION

The present invention relates to a pneumatic pesticide duster for use in applying pesticide to structures utilizing a dust-air mixture. More particularly, in a preferred embodiment of the present invention, the pneumatic duster utilizes a metallic exit tube whose opening has a surface area up to about $\frac{3}{4}$ square inch regardless of a configuration of the opening. The tube is of a material which will impart an electrostatic, mutually repelling charge to the expelled dust particles. The driving air forces such particles into pest harborages, and the imparted electrostatic charge attracts said dust particles to all surfaces surrounding the harborage as well as any pest therein in a substantially uniform manner, before dissipation of the charge, thus providing both immediate and long-term control.

While the apparatus of the present invention, as well as the method of use, will be described with particular regard to the preferred embodiments and the description which follows, the scope of the invention is not limited thereto.

The present invention is for control of insects which inhabit structures and is designed to place a very finely divided insecticide dust both into pest harborages and into contact with the insects themselves so as to provide long term control. The advantages of the present invention reside in the fine control of the dust expelled as well as the electrostatic charge imparted thereto without the necessity of an outside power source. The electrostatic charge imparted to the dust will attract the dust to all surfaces of the harborages, both vertical and horizontal including horizontal overhead surfaces, and to the insects themselves. The pesticide dust will then act both as a contact poison by entering the integument of the insects, and provide control by ingestion when the insects encounter the dust in cleaning their feet and antenna. The quantity of pesticide and discharge pressure can be carefully controlled so that precise treatment with the dust may be made into cracks and crevices and wall voids without filling the inhabitable air space with large amounts of dust.

Briefly described, the present invention provides a remote air reservoir connected through an air tube to a dust reservoir which is of a size conveniently handled by one person. The dust reservoir is connected to an outlet tube containing thereon a pressure regulator which allows air pressure to be adjusted according to particular application being encountered. Dust-air mixture is then discharged through a metallic tube having an opening whose surface area is suitable for the area to be treated, and which generally ranges up to about $\frac{3}{4}$ square inch and which has an appropriate configuration to enter the pest harborages, said expelled dust-air mixture having an electrostatic charge to mutually repel dust particles and attract said particles to the surfaces of the harborage and to any insects therein.

The discharge tube utilized in the present invention is metallic and capable of imparting an electrostatic charge to the discharged dust. While any metal capable of imparting such an electrostatic charge can be used, inexpensive and commonly available copper or brass metallic tubes are preferred.

The opening of the discharge tube is of convenient size for the pest harborage treated, generally ranging up to about $\frac{3}{4}$ square inch. Preferably, small harborages are treated using an opening of about $\frac{1}{8}$ square inch or less, while larger harborages are treated from openings ranging from about $\frac{1}{4}$ square inch to about $\frac{1}{2}$ square inch.

Since in practice pest harborages are difficult to reach, the configuration of the metallic discharge tube can be selected to provide adequate access to the harborage being treated. For example, cracks will normally be treated using a slit-like opening, resembling a vacuum cleaner furniture tool, while stud wall voids will normally be treated with an essentially circular discharge opening. Air pressure and opening size are selected based upon the approximate void area under treatment, and are quickly and easily selected after only a small amount of experience.

The dust reservoir of the present invention preferably is provided with quick-disconnect means to attach to the air supply, as well as to the outlet tube such that different pesticides can be utilized, each in a different dust reservoir, or a reservoir from which all dust has been expelled can be replaced. The proper pesticide can then be selected, and the dust reservoir containing said pesticide can be used in the apparatus. Thus various reservoirs can be used and interchanged quickly, depending upon the pest harborage being treated, such that contamination of any pesticide dust with other pesticides does not occur. Thus the dust reservoirs are interchangeable and preferably of sufficiently small size that movement by one person is easily accomplished. Dust reservoirs are designed and constructed for simple replacement or removal from the air tube means.

While in practice, size of dust reservoirs can vary substantially, we have found that a preferred size for a dust reservoir is from 8 to 10 inches in diameter and from 12 to 14 inches in height. Such a reservoir provides adequate treatment time while remaining easily handled by one person. For pest harborages requiring small amounts of pesticide, reservoirs of very small size, containing about 8 ounces of dust, can be used.

Air or gaseous medium from the remote source which enters the dust reservoir entrains dust into the moving air stream by any one of several means, including simply blowing air into the reservoir, pushing air through the bottom of the reservoir utilizing a perforated cross with many air outlets, sending air through a perforated plate into an open area below the dust reservoir, said air then rising through the perforated plate and entraining dust or any method known to those skilled in the art. It is preferred that the pesticide be sufficiently dry to easily disperse in the gaseous medium. To maintain proper humidity of the pesticide, a desiccator can optionally be inserted in the incoming air line. While any gaseous medium can be used, compressed air is preferred as the most economical and innocuous medium.

A preferred means for entraining dust into air is the use of a simple flexible rubber tube which depends from the air inlet means and having a free end depending within the dust reservoir vessel. As air pressure is released through the manually operated valve, more air enters the dust reservoir from the remote air source through the flexible tube, entering the dust reservoir by exiting the free end of the flexible tube, forcing a violent agitation of the flexible rubber tube, thus directing the flow of air to all portions of the dust reservoir in a violent fashion and rapidly and efficiently entraining dust into the gaseous air mixture.

In using the apparatus of the present invention in treating structures with pesticide dust, dust is introduced into pest harborages in desired quantity through an orifice adapted to the particular pest harborage being treated. For example, one person carrying the apparatus attached to a remote air source by an air supply tube can utilize this apparatus for blowing dust through cracks, around baseboards, or by drilling a small hole between studs in stud walls and manually injecting short bursts of air containing dust into the void space. Imparted electrostatic charge immediately attracts the dust particles to the surfaces of the pest harborage away from inhabitants of the structure, adhering the particles to the surfaces of the pest harborage and any pests contained therein, thus preventing the spread of dust into the inhabited or useful area of the structure itself.

It is thus apparent that this invention contains features of construction, a combination of elements and the arrangement of parts which provide distinct advantages in the pesticide art over prior art apparatus and methods and which will be exemplified in the description and drawings as hereinafter set forth.

BRIEF DESCRIPTION OF THE DRAWINGS

For a fuller understanding of the nature and objects of the present invention, reference should be made to the following detailed description taken in connection with the accompanying drawings in which drawings FIG. 1 is a side cut-a-way view of the invention, particularly in sections to illustrate major construction details.

FIG. 2 illustrates the basic dust reservoir containing a simple open end tube in order to entrain dust into air.

FIG. 3 illustrates a perforated cross-member which allows better air distribution within the dust reservoir.

FIG. 4 shows a perforated plate air distribution method, while

FIG. 5 shows a preferred rubber tube air distribution method.

DETAILED DESCRIPTION OF THE DRAWINGS

Figures 1, 2, 3, 4, 5, 6, 7:
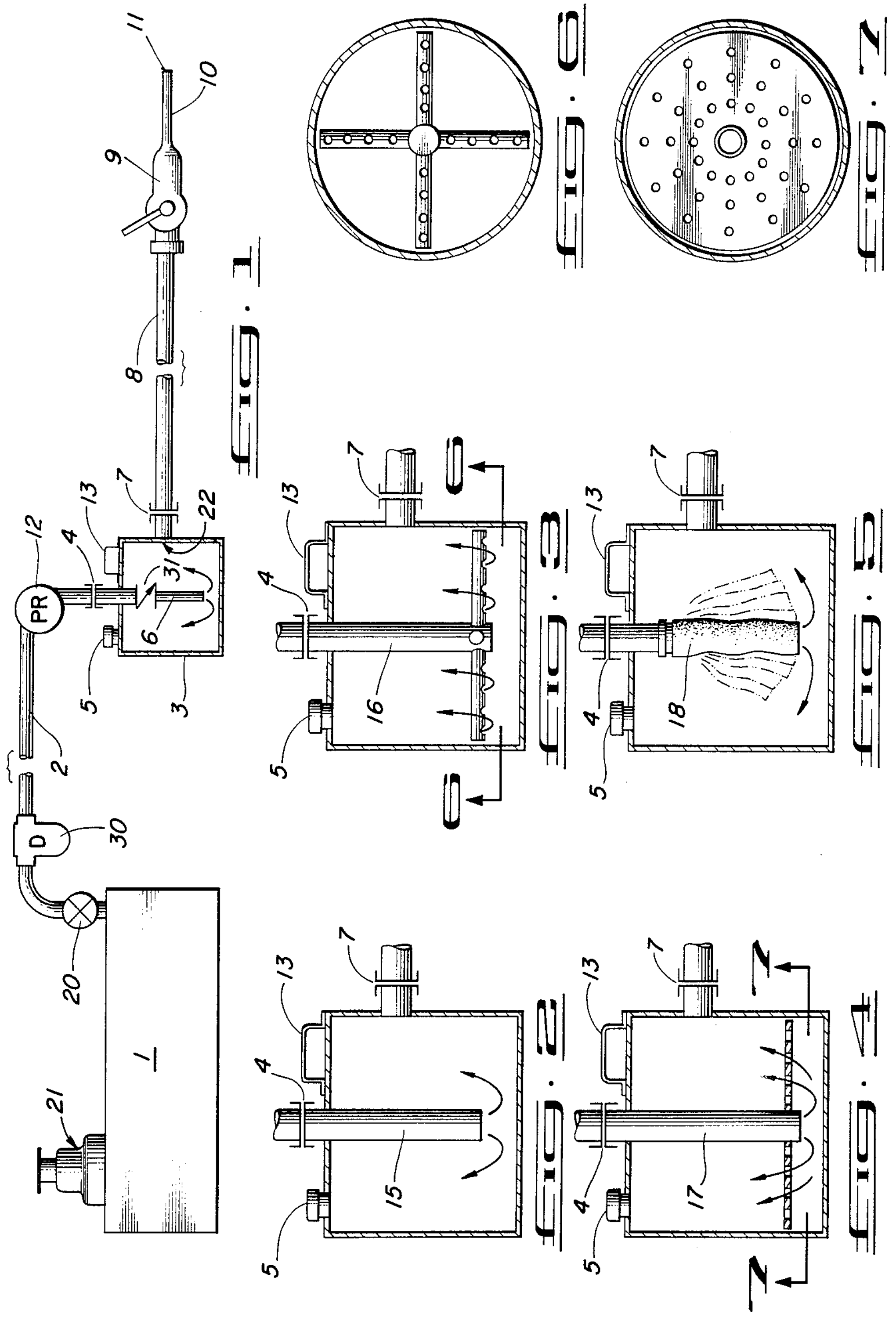

The pneumatic pesticide dust apparatus of the present invention is generally shown in FIG. 1. In FIG. 1, (1) is a remote air reservoir means maintained by compressor means (21). Air flow is through an air tube (2) capable of containing air pressure produced by the compressor and connected to a dust reservoir (3). The air tube is provided with a valve (20) to stop air flow. In the figure, the end of the air tube is equipped with a fitting (4) which mates with the dust reservoir (3) and allows a quick connect/disconnect to the dust reservoir. Dust reservoir (3) is likewise provided with a loading and cleaning aperature (5) and contains suspended from the interior of the reservoir an air dispersing means (6). Air which enters the reservoir entrains dust in gaseous flow and exits the reservoir through an exit (22) containing a quick disconnect fitting (7) to which is attached a flexible outlet tube (8) of sufficient length to conveniently treat pest harborages. The outlet tube is attached to a manually operated valve (9) to which is attached a metallic exit tube (10) capable of imparting an electrostatic charge to the air/dust mixture as it exits through the dust air orifice (11). The dust/air orifice can have any convenient shape for treating pest harborages, ranging from a circle to a long narrow slit for treating cracks and the like. Attached to the incoming air line immediately before the dust reservoir is an air pressure regulator (12) which can be adjusted to vary the air pressure depending upon the approximate volume of the pest harborage to be treated. While the pressure regulator can be attached in the line where convenient, it is preferred to place the regulator before the dust reservoir in order to avoid clogging the regulator with dust. As is known in the art, desiccators (30) water traps and the like can be inserted into the air line as needed. A one-way valve (31) is optionally used to prevent dust escape if the reservoir is accidentally disconnected while the reservoir is pressurized. In addition, dust reservoirs are conveniently equipped with handles (13) to provide easy carrying. Various opening discharge sizes are connected using an attaching means such that they may be easily and quickly connected and disconnected from the metal tube in order to facilitate treating various pest harborages.

It should be noted that the dust reservoirs can be easily and quickly prepared from common materials such as portable air bubbles, sprayer compression tanks, air compressor lines and quick disconnect fittings such that construction is easily accomplished.

With the apparatus of the present invention, several dust reservoirs can be prepared, each containing a different pesticide such that treatment of various structures or various areas within a single structure can be easily accomplished by simply preventing air flow by closing valve (20) disconnecting the air flow from the air reservoir, disconnecting the quick connect fittings from dust reservoir, and reconnecting a reservoir with the desired pesticide, then reopening valve (20).

FIG. 2 shows an internal detail of a dust reservoir in which a simple open air tube is depended in order to entrain dust into the air exiting the apparatus.

FIG. 3 shows an alternative method of entraining dust from a reservoir wherein the air enters the dust reservoir, passes completely to the bottom and enters the reservoir air spaces through several openings in hollow cross-members attached to the incoming air line.

FIG. 4 shows a perforated plate completely across the bottom of the dust reservoir, said plate maintaining dust above the plate such that air pressure entering the dust reservoir passes to the bottom of the perforated plate and enters the reservoir in small streams through holes in the plate, entraining dust in passage.

FIG. 5 shows a preferred embodiment of the present invention wherein the incoming air passes through a simple flexible rubber tube, which tube is violently agitated by the passage of air, thus directing the air stream towards all portions of the dust reservoir and thereby entraining and eventually using substantially all the dust in the reservoir.

FIG. 6 is an upper cross-sectional prospective of the air distribution apparatus of FIG. 3. FIG. 7 is an upper cross-sectional view of the air distribution apparatus of FIG. 4.

In addition, the present invention allows an improved method for treating structures with pesticide dust by placing said pesticide dust into pest harborages within the structure while closely controlling the distribution of said dust within the harborages by imparting a friction-induced electrostatic charge to the dust to mutually repel and suspend said particles while electrostatically attracting and attaching said particles to the structure and pests therein, wherein the dust is applied using the apparatus of the present invention.

In carrying out the method of the present invention, we have found that air pressure should be maintained between about 5 and about 100 pounds per square inch, preferably 10 to about 60 pounds per square inch (psi) and should be adjustable via the use of a pressure regulator (12) similar to that used for regulating pressure in selfcontained underwater breathing apparatus and the like. In the apparatus actually built, the manually operated valve (9) is a simple thumb-actuated valve which allows the operator to maintain air-dust mixture flow for as long as desired. The model actually built used a simple tube of $\frac{3}{8}$ inch copper pipe attached to the valve which imparted an electrostatic charge to the expelled dust-air mixture and showed excellent coating of wood, stone, plastic and glass surfaces. The discharge opening and air pressure will be balanced so that an electrostatic charge is imparted to the the discharged dust.

The present invention is capable of applying all pesticide dusts. Generally, dust having a majority of the particles capable of passing a 200 U.S. mesh is preferred, although dusts of larger particle size can be used. Representative but non-exhaustive examples of such dusts are insecticide dusts such as sodium fluoride; pyrethrum-containing powders; 2,2-dimethyl 1,3-benzodioxyl-4-01; boric acid powder; diazenon; and diethyl-2-isopropyl-6-methyl-4-pyrimidinyl.

It should be recognized that although the instant apparatus was built with commonly available materials, more exotic materials could be substituted for those used without any lessening of the excellent control and treatment effects we have obtained.

Our invention is more concretely described with reference to the included examples and it should be realized that these examples are provided to illustrate our invention and not to limit it.

EXAMPLE 1

In order to test the effectiveness of the present invention, a stud wall mock up was built providing a typical interior stud wall for a human habitation. One side of tne stud was covered with a sheet of ½ inch plywood while the opposite side was covered with a sheet of clear plexiglass in order that the effects of the duster could be observed. A hole approximately ⅝ inch in diameter was drilled midway between the two studs approximately 6 inches from the top through the wood side.

A commonly available pesticide in an aerosol can (Whitmire PT-240 Permadust, trademark of and sold by Whitmire Research Labs, Inc., St. Louis Mo.) After spraying through the hole only a very small area of coverage was realized, and although the propellant fumes appeared to fill the void space, the pesticide itself covered only an area approximately 6 inches in diameter on the plexiglass wall directly opposite the hole drilled in the plywood. The plexiglass wall was at standard stud width (3½ inches) from the plywood. No coverage of the remainder of the plexiglass wall, the plywood, or studs on either side of the hole was visually apparent.

The apparatus of the present invention was then tested with boric acid powder having a mesh size sufficiently small that majority of the particles passed a low mesh and using an air pressure of about 20 pounds per square inch propelled through a half inch copper tube. A three second burst of air-dust mixture completely filled the atmosphere of the stud wall interior with finely dispersed dust particles. After approximately 5 minutes substantially all the dust had been attracted to all walls, including the stud walls, the plexiglass and the plywood. It was estimated that 80% of the expelled dust had been attached to the walls, while only about 20% settled to the bottom of the void air space.

In a comparison carried out using a common hand bellows duster, approximately 95% of the powder dropped to the bottom of the mock-up wall void while only 5% adhered to the interior wall surfaces.

EXAMPLE 2

A nursing home had been treated for infestations of the German cockroach by manually placing and brushing boric acid powder into the available pest harborages. Effective control was not achieved, estimated to be only a 50% to 60% control ratio.

The same nursing home was then treated using the apparatus of the present invention and boric acid powder. All treatment was done by injecting the powder at an air pressure of about 10 to 15 pounds per square inch through a ⅜ inch copper/brass tube. Boric acid was inserted into available harborages by forcing the boric acid deeply into the harborages utilizing the air pressure of about 15 pounds per square inch with the apparatus of the present invention. Harborages from floor level, near the ceiling, behind cabinets, window and door trim, baseshoes, closet shelving, soffets, under lavatories and above sinks, interiors of bedside tables and chest of drawers, wall voids associated with plumbing, under tables and chairs, around, under and behind kitchen equipment, around electrical fixtures, ceiling voids, and other cracks, crevices and insect harborages were treated. Nearly 100% control was achieved with a single treatment.

EXAMPLE 3

A private dwelling was treated by professional exterminators for infestations of the German cockroach using Dursban 4E pesticide at 0.5% rate in water. Effective control was not achieved initially, and reinfestation rapidly reoccurred. Using the apparatus of the present invention a single treatment was estimated to be about 99.5% effective after 30 days.

Thus it can be seen that the objects of the present invention have been efficiently obtained, in that a method for eradicating pests in structures while controlling the distribution of dust and maintaining the safety of any inhabitants. The apparatus of the present invention is prepared from inexpensive materials.

While certain embodiments and details have been shown for the purpose of illustrating this invention, it will be apparent to those skilled in this art that various changes and modifications may be made herein without departing from the spirit or scope of the invention.

We claim:

1. An improved method for treating structures with pesticide dust by placing said dust into pest harborages within said structures, the improvement comprising closely controlling the distribution of said dust within said harborages by imparting a friction induced electrostatic charge to said dust to mutually repel and suspend said particles while electrostatically attaching said particles to the structure and pests therein, wherein the dust is applied by (a) placing pesticide dust in a dust reservoir having attached thereto an air input aperature connected to a source of pressurized air and a dust/air mixture outlet aperture connected to (b) a manually operated valve regulating the flow of dust/air mixture, and (c) a metallic tube downstream of said valve capable of imparting a friction induced electrostatic charge to discharged dust, said tube having an opening up to about ¾ inch, and (d) a flexible tube attached at one end to said air input aperature within said dust reservoir vessel, and having a free end depending within said reservoir vessel, such that air/dust mixture released by actuating said valve allows air to enter the dust reservoir from the pressurized air source through said flexible tube, said tube being agitated by the incoming air exiting through the free end of said flexible tube and directing said air throughout said reservoir such that substantially all dust is entrained by said air and forced through the exit aperature when the valve of (b) is actuated.

2. A method as described in claim 1 wherein said dust reservoir is capable of maintaining an air pressure up to about 100 pounds.

3. A method as described in claim 2 wherein said exit tube is copper or brass.

4. A method as described in claim 3 wherein the majority of the dust is comprised of particles of less than about 200 mesh.

5. A method as described in claim 4 wherein the dust is an insecticide dust selected from the group consisting of drione insecticide; sodium fluoride, pyrethrum powder; diazenon; d,2-dimethyl 1,3-benzodioxyl-4-01; boric acid powder; and diethyl-2-isopropyl-6-methyl-4-pryrimidinyl.

6. A method as described in claim 5 wherein the dust reservoir is of convenient size to be handled by one person and is connected to a remote source of pressurized air.

7. A method as described in claim 6 wherein the air pressure within the dust reservoir is regulated by a pressure valve means.

8. A pneumatic duster apparatus comprising (a) an enclosed dust reservoir having an air input aperature connected to a source of pressurized air and a dust/air mixture outlet apperature connected to (b) a manually operated valve regulating the flow of dust/air mixture, and (c) a metallic tube downstream of said valve capable of imparting a friction-induced electrostatic charge to discharged dust, said tube having a discharge opening up to about $\frac{3}{4}$ inch, and (d) a flexible tube attached at one end to said air input aperature within said dust reservoir vessel, said flexible tube depending in said reservoir and having the free end depending in said vessel such that air/dust mixture released by actuating said valve allows air to enter the dust reservoir from the pressurized air source through said flexible tube, said tube being agitated by the incoming air exiting through the free end of the flexible tube and directing said air throughout said reservoir such that substantially all dust is removed by exiting air.

9. An apparatus as described in claim 8 wherein the dust reservoir is capable of maintaining an air pressure up to about 100 pounds.

10. An apparatus as described in claim 9 wherein said discharge tube is copper or brass.

* * * * *